(12) United States Patent
Stern et al.

(10) Patent No.: US 8,439,511 B2
(45) Date of Patent: May 14, 2013

(54) MIRROR AND A METHOD OF MANUFACTURING THEREOF

(75) Inventors: Theodore Garry Stern, El Cajon, CA (US); Stephen Leonard Engelson Wyatt, San Diego, CA (US)

(73) Assignee: Vanguard Space Technologies, Inc., San Diego, CA (US)

( * ) Notice: Subject to any disclaimer, the term of this patent is extended or adjusted under 35 U.S.C. 154(b) by 0 days.

(21) Appl. No.: 12/976,955

(22) Filed: Dec. 22, 2010

(65) Prior Publication Data

US 2012/0162772 A1    Jun. 28, 2012

(51) Int. Cl.
*G02B 7/188* (2006.01)
*G02B 7/192* (2006.01)

(52) U.S. Cl.
USPC ........................................ 359/883; 428/912.2

(58) Field of Classification Search ............... 428/912.2; 359/883
See application file for complete search history.

(56) References Cited

U.S. PATENT DOCUMENTS

| | | | | | |
|---|---|---|---|---|---|
| 4,670,338 | A | * | 6/1987 | Clemino | 428/312.6 |
| 4,791,076 | A | * | 12/1988 | Leggett et al. | 501/95.2 |
| 4,842,398 | A | * | 6/1989 | Ducassou | 359/883 |
| 4,875,766 | A | * | 10/1989 | Shimodaira et al. | 359/883 |
| 5,433,995 | A | * | 7/1995 | Matthews et al. | 428/300.7 |
| 5,589,523 | A | * | 12/1996 | Sawaoka et al. | 523/211 |
| 5,864,434 | A | * | 1/1999 | Taylor | 359/883 |
| 6,206,531 | B1 | * | 3/2001 | Williams et al. | 359/883 |
| 2006/0161267 | A1 | * | 7/2006 | Clausen | 623/55 |
| 2011/0080666 | A1 | * | 4/2011 | Odhner | 359/839 |

* cited by examiner

*Primary Examiner* — Mark Consilvio
(74) *Attorney, Agent, or Firm* — DLA Piper LLP (US)

(57) ABSTRACT

A mirror for terrestrial or aerospace application has a substrate, which is preferably of a laminate of a plurality of Graphite Fiber Reinforced Composite (GFRC) uni-directional fiber plies applied in a laminate with layers oriented to achieve appropriate stable properties. The substrate is cured to form the desired shape with a first surface and a second surface opposite the first surface. A front buffering layer is immediately adjacent to and contiguous with the substrate on the first surface. The front buffer layer is of a material that buffers the surface morphology of the first surface of the substrate. A front specularizing layer is immediately adjacent to and contiguous with the front buffer layer. The specularizing layer is of a material for providing a smooth, low scatter optical surface. The specularizing layer can use an integral aluminized surface or an added vacuum deposited optical thin film coating for enhanced optical properties and durability. The mirror further has a rear buffering layer which is immediately adjacent to and contiguous with the second surface of the substrate. Finally, the mirror has a rear film which is immediately adjacent to and contiguous with the buffering layer. The material for the rear buffering layer can be the same material as that for the front buffering layer, and the material for the rear film can be the same material as that for the front specularizing layer, so as to balance the Coefficient of Thermal Expansions (CTE) of the front layers.

20 Claims, 1 Drawing Sheet

MIRROR AND A METHOD OF MANUFACTURING THEREOF

TECHNICAL FIELD

The present invention relates to a mirror and, more particularly, to a mirror that is well suited for deployment and use in harsh terrestrial and aerospace environments. The present invention also relates to a method of manufacturing such a mirror.

BACKGROUND OF THE INVENTION

Mirrors or optical apparatuses to reflect, focus or concentrate impinging electromagnetic radiation are well known in the art. At least three of the properties that a mirror must have are that the optical surface must have an accurate contour, that the optical surface be specular (smooth or polished) and that the optical surface reflects the appropriate electromagnetic radiation. Although mirrors have been manufactured for use in terrestrial applications as well as outer space applications, for extra-terrestrial application, the mirror must withstand other environments such as UV radiation, temperature cycling, temperature gradient, contamination, self contamination, and the impact of particles (such as atomic particles, and space debris) impinging on the optical surface of the mirror. Currently, the substrate of mirrors that support the optical surface have been made from material such as glass, metal or ceramic, all of which require certain thickness and mass for surface contour accuracy and stability. Graphite Fiber Reinforced Composite (GFRC) materials are also well known in the art. GFRC structures can have high stiffness and stability at extremely low mass. However, fibers from a GFRC structure can have a surface morphology that impacts the optical surface.

In addition, for extra-terrestrial applications the mirror must be thin, less than 0.35 mm in thickness, and light weight, less than 0.7 kgm/sq. meter mass/area, and be able to survive the temperature range of −180 C to +150 C, including multiple cycles between these extremes, without incurring permanent distortion of degradation of the mirror surface.

Prior art methods to provide an optical surface to a GFRC substrate have involved techniques such as direct replication. In direct replication, a thick layer of resin such as epoxy is applied to a contoured GFRC substrate, and then cured against a mandrel having a polished surface to create a smooth specular surface. The thickness of the resin layer depends on the level of local roughness and large scale contour errors, which results in differences between the substrate front surface and the mandrel which the replication resin fills in. Further the front surface of the specular resin layer has a thin film vacuum deposited metallic coating to provide a high spectral reflectance to the specular surface. The metallic coating can be applied in one of two ways. First, the reflective coating can be applied to the mandrel prior to replication of the resin layer, in which case the reflector coating is released from the mandrel already bonded to the resin. Alternatively the reflector coating can be applied to the replicated resin surface after the resin layer is cured by conventional optical thin film vacuum deposition coating methods, such as ion beam sputtering or the like. The disadvantage of using the direct replication method is that the resin has to be relatively thick, on the order of 0.5 mm or more, and can crack and degrade when exposed to thermal and humidity cycling across the temperature and humidity ranges of terrestrial and aerospace applications. These effects are exacerbated by the generally high Coefficient of Thermal Expansion (CTE) and coefficient of moisture expansion (CME) of the resin, compared to the CTE and CME of the GFRC substrate. Another disadvantage of the direct replication approach is the need to get good, bubble-free contact between the resin and the replication mandrel, and the need to apply a release layer to allow the resin on the GFRC substrate to be released from the mandrel. Referring to FIG. 1 there is shown a cross-sectional view (highly exaggerated) of the mirror of the prior art made by the direct replication method.

Other methods for providing a specularizing layer for the mirror surface include adding a polishable metal or amorphous (glassy) surface layer or a thick plastic layer directly to the GFRC substrate, and subsequently grinding and polishing this layer using conventional optical manufacturing methods. The disadvantage of this method is that the added layer of metal or plastic has to cover irregularities of varying thickness adding mass, thermal instability, and the risk that surface grinding and polishing can punch through or perforate the specularizing layer, exposing the substrate. The front layer, made from a dense polishable material, can also introduce local or global contour errors into a thin substrate due to CTE mismatch stresses.

Accordingly, it is one object of the present invention to provide a mirror that uses a thin substrate and is therefore, light weight and can be manufactured to withstand the hazardous environment of outer space.

SUMMARY OF THE INVENTION

A mirror comprises a substrate having a first surface and an opposed second surface. The substrate is of a material having thermo-mechanical stability, low mass and stiffness for providing a shape to the mirror. A front non-specular buffer layer is immediately adjacent to and contiguous with the substrate on the first surface. The front buffer layer is a of a material to buffer the surface morphology of the first surface of the substrate. A front specularizing layer is immediately adjacent to and contiguous with the front buffer layer. The specularizing layer is of a material for providing a smooth, low scatter durable optical surface. A rear buffer layer is immediately adjacent to and contiguous with the substrate on the second surface. A rear film layer is immediately adjacent to and contiguous with the rear buffer layer. The rear buffer layer and the rear film layer are of a material providing thermo-mechanical balance to the front buffer layer and front specularizing layer and have coefficients of thermal expansion (CTE) to balance the difference in CTE between the substrate and the front buffer layer and the front specularizing layer.

The present invention also relates to a method of manufacturing the foregoing described mirror.

DETAILED DESCRIPTION OF THE PREFERRED EMBODIMENT

Figure 1:
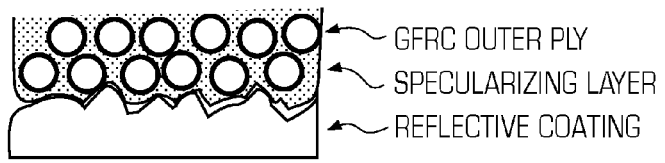
FIG. 1 is a cross-sectional highly exaggerated view of a portion of a mirror of the prior art made by the direct replication process.
Figure 2:
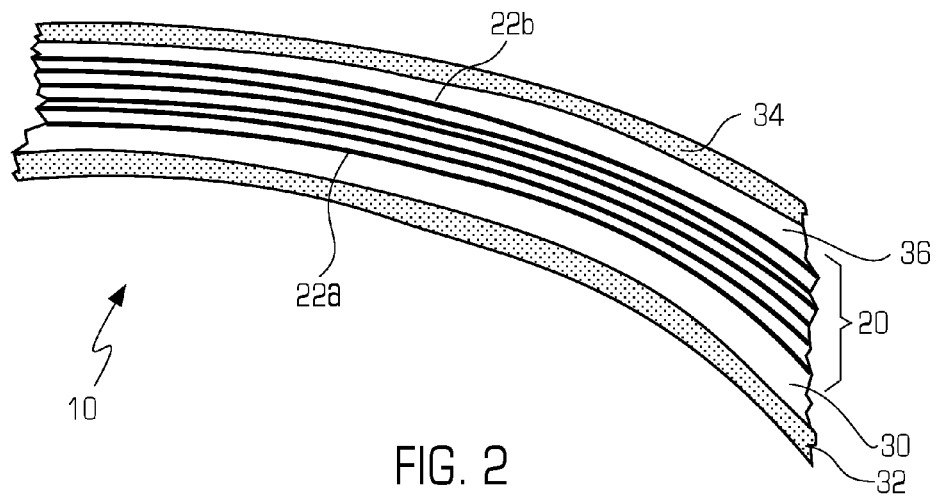
FIG. 2 is a cross-sectional view of a mirror of the present invention.

Referring to FIG. 2 there is shown a cross-sectional view of a mirror 10 of the present invention. The mirror 10 comprises a substrate 20. The substrate 20 has a first surface 22a and a second surface 22b, opposite the first surface 22a. The substrate 20 serves to provide the shape or contour of the mirror 10. The contour can be spherical, aspherical, cylindrical, cylindrical aspheric, planar, or any other shape. The substrate 20 is of a material which provides thermo-mechanical stability, low mass, and stiffness. It can be made from metals, composite sandwich structures, plastic or in the preferred embodiment Graphite Fiber Reinforced Composite (GFRC). In the preferred embodiment, the substrate 20 is a six layer GFRC laminate composite in which the plies or layers are uni-directional plies, arranged in a sequential direction layup to provide quasi-isotropic properties and a balanced laminate, such as (0/60/−60/−60/60/0) with each ply comprising a 0.04 mm layer of graphite fibers, such as Mitsubishi's K13D2U in a cyanate resin ester matrix, such as Tencatels RS3-C control flow cyanate resin. In the preferred embodiment, the six ply GFRC substrate 20 is cured on a shaped forming mandrel machined with high precision to provide the contour of the mirror 10. Other fibers can also be used. These include M55J graphite fiber from Toray Industries, Inc., or fiberglass, or Nomex (a registered trademark of E. I. du Pont de Nemours and Company Corporation) or Kevlar (a registered trademark of E. I. du Pont de Nemours and Company Corporation) fibers, depending on the amount of stiffness and thermal stability required. Fiberglass or other common fibers may also be used for low cost terrestrial applications. Other fiber reinforcement forms, such as woven fabric or felt mats, and other resin matrices, including epoxies, polyimides or bis-maleamide resins, or other thermoplastic resins as well as thermosetting plastic resins may also be used.

Immediately adjacent to and contiguous with the first surface 22a of the substrate 20 is a front buffer layer 30. The front buffer layer 30 serves to buffer any untoward surface morphology of the substrate 20 to prevent it from telegraphing to the front specularizing layer 32. The front buffer layer 30 is preferably of a moldable material so that it can be cast to provide a smooth front surface suitable for allowing the specularizing layer to match up to a polished mandrel. Because the front buffer layer does not have to provide the specular outer surface, it can be much thinner than the material used in direct mirror replication, and any degradation in the buffer layer will not impact the outer surface quality. The choice of materials suitable for the front buffer layer 30 includes plastics or adhesives. In the preferred embodiment, the front buffer layer 30 is a cyanate resin ester film having a thickness of less than 0.05 mm, which also provides the adhesive bond between the substrate and the specularizing layer 32.

Immediately adjacent to and contiguous with the first buffer layer 30 is a front specularizing layer 32. The front specularizing layer 32 is the optical reflective layer that serves to reflect and image, or redirect, electromagnetic radiation or photons incident thereon. The front specularizing layer 32 provides a microscopically smooth, low scatter surface for the mirror 10, with a surface that is more durable than front buffer layer 30. Thus, the specularizing layer 32 is a film selected from a polymer film, such as polyimide film, or glass or metal. In the preferred embodiment, the front specularizing layer 32 is a film made of aluminized mylar, formed of approximately 0.025 mm (0.001") thick. The mylar layer 30 is co-cured with additional cyanate, which is of a resin film, to a thickness of approximately 0.025 mm (0.001") thickness to the first surface 22a of the substrate 20, in a second stage autoclave process on a replication mandrel, which has a similar shape as the mandrel used to form the contour of the substrate 20, but with a highly polished surface.

Immediately adjacent to and contiguous with the second surface 22b of the substrate 20 is a rear buffer layer 36. Immediately adjacent to and contiguous with the rear buffer 36 is a rear film layer 34. The function of the rear buffer layer 36 and the rear film layer 34 is to provide thermo-mechanical balance, stiffness and to balance the Coefficient of Thermal Expansion (CTE) of the front buffer layer 30 and specularizing layer 32. Thus, the rear buffer layer 36 may be of the same material as the material of the front buffer layer 30, and the material of the rear film layer 34 is of the same material as the specularizing layer 32. However, for cost consideration, it is not necessary that the materials be the same, so long as the rear buffer layer 36 and the rear film layer 34 provide the necessary thermo-mechanical and CTE balance to the front layers 30 and 32. Finally, of course, whether or not a front coating layer (not shown) is provided on the specularizing layer 32, a rear coating layer (not shown) can also be applied to the rear film layer 34. A rear coating layer (not shown) need not have the same thermo-mechanical property and CTE property as the front coating layer (not shown) because typically the layer is too thin to impart CTE stress. However, the rear coating layer may provide the necessary properties to interface with the environment, such as having appropriate reflectivity and thermal emissivity to control temperature or having sufficient electrical insulation or conductivity properties for the particular application. The rear coating layer may also provide an interface for the structural support for the mirror 10 for example by providing a durable faying surface for bonding a back rib, such that the mirror 10 may then be mounted on a rib structure or on a contoured sandwich panel.

Figure 3:
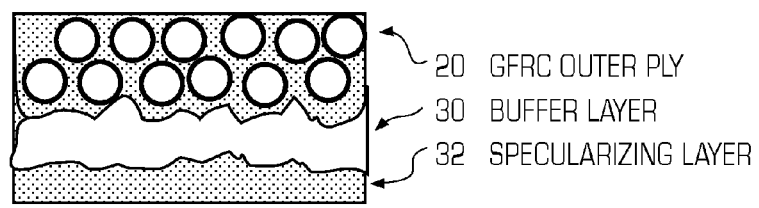
FIG. 3 is a cross-sectional highly exaggerated view of a portion of the mirror of the present invention shown in FIG. 2.

The manufacture of the mirror 10 involves two laminating steps—a mirror substrate forming step, and a mirror replication step. First the mirror substrate forms the substrate 20 of GRFC material, which is fabricated using any of a variety of fiber reinforced composite fabrication techniques to laminate the composite material onto an accurately shaped mandrel, to form the shape of the mirror 10. The substrate 20 is bagged, cured in an oven or autoclave, debagged, removed from the mandrel, trimmed, and prepped for the second, replication step. In the second replication step, the mirror substrate 20 from step one is used as one layer in a multi-layer composite that is formed on a replication mandrel with a highly polished mandrel surface, and includes the specularizing layer 32, the front buffer layer 30, the substrate 20, the back buffer layer 36, and the back balancing layer 34. The specularizing layer 32 with an optical reflective coating is first applied to the polished surface of the mandrel, followed by the application of the front buffer layer 30, followed by the substrate 20, followed by the back buffer layer 36, and finally by the back balancing layer 34. The layers are applied to the replication mandrel, the part is bagged, cured in an oven or autoclave, debagged and removed from the mandrel, with final trim and final coating application finishing the mirror part. The aluminum surface (reflective surface) of the specularizing layer 32 can also provide the release function for parting the mirror from the polished mandrel in the second step of the two step fabrication process. —the mirror replication step. At this point the mirror front surface is specular and includes the reflective aluminum material. Alternatively, the specularizing layer 32 without the reflective aluminum coating may be applied to the polished surface of the mandrel, followed by the application of the front buffer layer 30, followed by the substrate 20, followed by the back buffer layer 36, and finally by the back balancing layer 34. Referring to FIG. 3 there is shown a highly exaggerated cross-sectional view of a portion of the mirror 10 of the present invention.

Optionally, an additional coating layer can be added to the aluminum surface of the specularizing layer 32 for even higher reflectance, such as First Surface Protected Silver (FSP-Ag) coating, comprising a layer of silver and a transparent front side overcoat of SiOx, which is a mixture of silicon monoxide and silicon dioxide, and which would be applied by vacuum coating techniques. Or if the front specularizing layer 32 is an uncoated polymer or polyimide layer, such as uncoated mylar, then an optional reflective coating (not shown) can be applied to the front specularizing layer 32 to provide the desired optical reflectance property. Other thin film coatings are possible, including other reflective metals including gold, aluminum, or rhodium, as well as transparent overcoatings, including transparent conductive oxides, and multi-layer dielectric filters. By thin film coatings, it is meant a coating having one or more layers each typically less than 1 micron in thickness.

From the foregoing, it can be seen that the present invention provides a protected buffer layer 30 (protected by a specularizing layer 32) which is protected from the environment so that it does not need to retain a specular surface, unlike the prior art direct replication method wherein the resin layer is directly exposed to the environment. The specularizing layer 32 provides a way to replicate with a durable film that does not need grinding or polishing and comes off the mandrel with an aluminized mirror surface.

What is claimed is:

1. A mirror comprising:
   a laminated substrate having a first surface and an opposed second surface; said substrate of a material having thermo-mechanical stability, low mass and stiffness for providing a shape to the mirror;
   a front non-specularizing buffer layer immediately adjacent to and contiguous with said substrate on said first surface; said front buffer layer is made of ester resin to buffer the surface morphology of said first surface of said substrate;
   a front specularizing layer immediately adjacent to and contiguous with said front buffer layer; said specularizing layer is pre-fabricated and made of a material for providing a smooth, low scatter optical surface;
   a rear buffer layer immediately adjacent to and contiguous with said substrate on said second surface;
   a rear film layer immediately adjacent to and contiguous with said rear buffer layer; and
   wherein said rear buffer layer and rear film layer are of a material providing thermo-mechanical balance to said front buffer layer and front specularizing layer and having coefficient of thermal expansion (CTE) to balance the difference in CTE between the substrate and the front buffer layer and the front specularizing layer.

2. The mirror of claim 1 wherein:
   said rear buffer layer is of a material which is the same material as the front buffer layer; and
   said rear film layer is of a material which is the same as the material of the front specularizing layer.

3. The mirror of claim 1 wherein said substrate is a material selected from: metals, composite materials, plastics and Graphite Fiber Reinforced Composite (GFRC).

4. The mirror of claim 3 wherein said substrate is a GFRC substrate made of a laminate of six plies, arranged in a sequential directional layup, with each ply comprising a layer of uni-directional graphite fibers in a cyanate resin matrix.

5. The mirror of claim 1 wherein said front buffer layer is cyanate ester resin material.

6. The mirror of claim 5 wherein said front specularizing layer is a film of aluminized biaxially-oriented polyethylene terephthalate.

7. The mirror of claim 1 wherein said front specularizing layer is a film selected from: polymer film, polyimide film, glass and metal.

8. The mirror of claim 1 further comprising a front coating layer immediately adjacent to and contiguous with said front specularizing layer; said front coating layer is of a material for providing high spectral reflectance, and durability to external environment.

9. The mirror of claim 8 wherein said front coating layer is a vacuum deposited silver reflectance coating.

10. A method of making an optical apparatus, comprising:
    forming a substrate having a first surface and an opposed second surface with a laminate of a plurality of plies, each ply comprising a layer of uni-directional graphite fibers in a resin matrix and applying the plurality of plies to a shape forming mandrel;
    curing the plurality of uni-directional plies on the shape forming mandrel to provide the shape of the substrate;
    removing the substrate from the shape forming mandrel; and
    forming a specular mirror by arranging on a polished replication mandrel:
    a specularizing layer on the polished mandrel,
    a front buffering layer on said specularizing layer,
    the substrate against the front buffering layer with the first surface against the front buffering layer,
    a back buffer layer on said second surface of said substrate, and
    a back film layer on said back buffer layer, by curing the plurality of layers on the replication mandrel.

11. The method of claim 10 wherein the specularizing layer is biaxially-oriented polyethylene terephthalate (BoPET).

12. The method of claim 10 further comprising bagging the layers before curing them on the mandrel.

13. The method of claim 10 further comprising a front coating layer immediately adjacent to and contiguous with said front specularizing layer; said front coating layer is of a material for providing high spectral reflectance, and durability to external environment.

14. A method of making a mirror, comprising:
    forming a substrate, with a first surface and an opposing second surface, made of fiber reinforced composite via a mandrel;
    curing the substrate;
    laying a buffer layer on the first surface of the formed substrate, wherein the buffer layer is smoother than the surface of the substrate;
    laying a prefabricated specularizing layer on the smooth buffer layer, the specularizing layer being a film of reflective material;
    laying at least one balancing layer on the substrate, on the second surface of the substrate opposite the buffer layer and specularizing layer, the at least one balancing layer having substantially the same thermo-mechanical properties as the buffer layer and specularizing layer; and
    curing the mirror.

15. The method of claim 14 wherein the specularizing layer is biaxially-oriented polyethylene terephthalate (BoPET).

16. The method of claim 14 further comprising bagging the layers before curing them on the mandrel.

17. The method of claim 14 further comprising a front coating layer immediately adjacent to and contiguous with said front specularizing layer; said front coating layer is of a material for providing high spectral reflectance, and durability to external environment.

18. The method of claim 14 wherein said front buffer layer is a cyanate resin material.

19. The method of claim 14 wherein, said at least one balancing layer is of a material which is the same material as the front buffer layer.

20. The method of claim 14 wherein, said at least one balancing layer is of a material which is the same as the material of the front specularizing layer.

* * * * *